US008931692B2

(12) United States Patent
Sancak

(10) Patent No.: US 8,931,692 B2
(45) Date of Patent: Jan. 13, 2015

(54) MULTI-COMMUNICATION FEATURED, TOUCH-OPERATED OR KEYBOARD CASH REGISTER WITH CONTACT AND NON-CONTACT CREDIT CARD READER

(76) Inventor: Murat Sancak, Ankara (TR)

( * ) Notice: Subject to any disclaimer, the term of this patent is extended or adjusted under 35 U.S.C. 154(b) by 0 days.

(21) Appl. No.: 13/980,301

(22) PCT Filed: Aug. 5, 2011

(86) PCT No.: PCT/IB2011/002607
§ 371 (c)(1),
(2), (4) Date: Jul. 17, 2013

(87) PCT Pub. No.: WO2013/021233
PCT Pub. Date: Feb. 14, 2013

(65) Prior Publication Data
US 2014/0183260 A1 Jul. 3, 2014

(51) Int. Cl.
*G06K 5/00* (2006.01)
*G06Q 90/00* (2006.01)
*G07G 1/00* (2006.01)
*G07F 7/08* (2006.01)

(52) U.S. Cl.
CPC .............. *G06Q 90/00* (2013.01); *G07G 1/0018* (2013.01); *G07G 1/0081* (2013.01); *G07F 7/0886* (2013.01)
USPC .......................................... 235/380; 253/383

(58) Field of Classification Search
USPC ................................................. 235/380, 383
See application file for complete search history.

(56) References Cited

U.S. PATENT DOCUMENTS 6,095,410 A * 8/2000 Andersen et al. ............. 235/380

* cited by examiner

*Primary Examiner* — Kristy A Haupt
(74) *Attorney, Agent, or Firm* — Gokalp Bayramoglu

(57) ABSTRACT

The invention relates to a device design used in commercial premises, in which a physically independent plurality of units (Electronic Funds Transfer, Point-of-Sale ("EFT POS") device, Pinpad, financial electronic cash register, Barcode reader and GPS based positioning device) are integrated in one single compact frame.

3 Claims, 2 Drawing Sheets

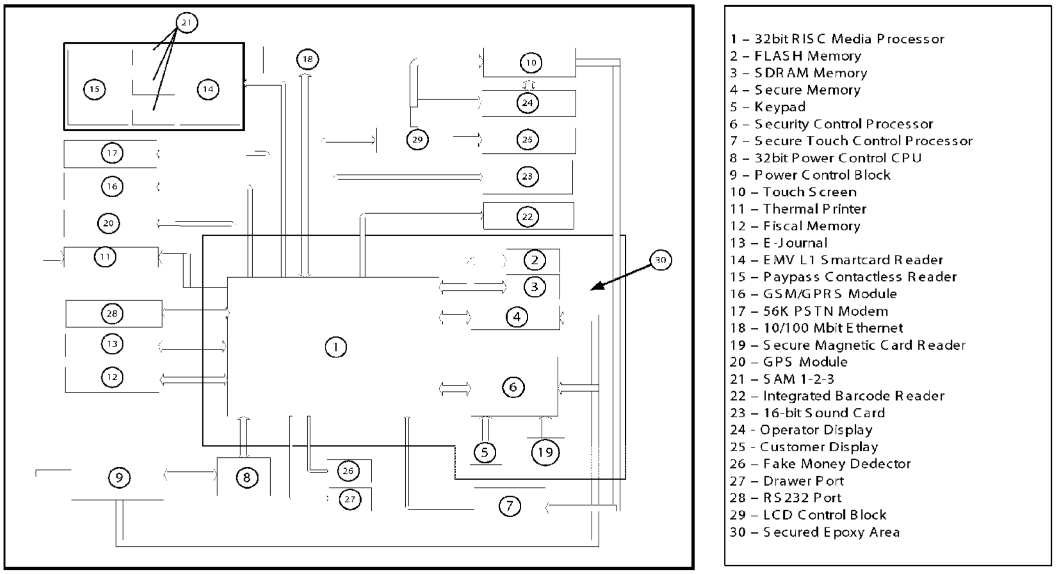

1 – 32bit RISC Media Processor
2 – FLASH Memory
3 – SDRAM Memory
4 – Secure Memory
5 – Keypad
6 – Security Control Processor
7 – Secure Touch Control Processor
8 – 32bit Power Control CPU
9 – Power Control Block
10 – Touch Screen
11 – Thermal Printer
12 – Fiscal Memory
13 – E-Journal
14 – EMV L1 Smartcard Reader
15 – Paypass Contactless Reader
16 – GSM/GPRS Module
17 – 56K PSTN Modem
18 – 10/100 Mbit Ethernet
19 – Secure Magnetic Card Reader
20 – GPS Module
21 – SAM 1-2-3
22 – Integrated Barcode Reader
23 – 16-bit Sound Card
24 – Operator Display
25 – Customer Display
26 – Fake Money Dedector
27 – Drawer Port
28 – RS232 Port
29 – LCD Control Block
30 – Secured Epoxy Area

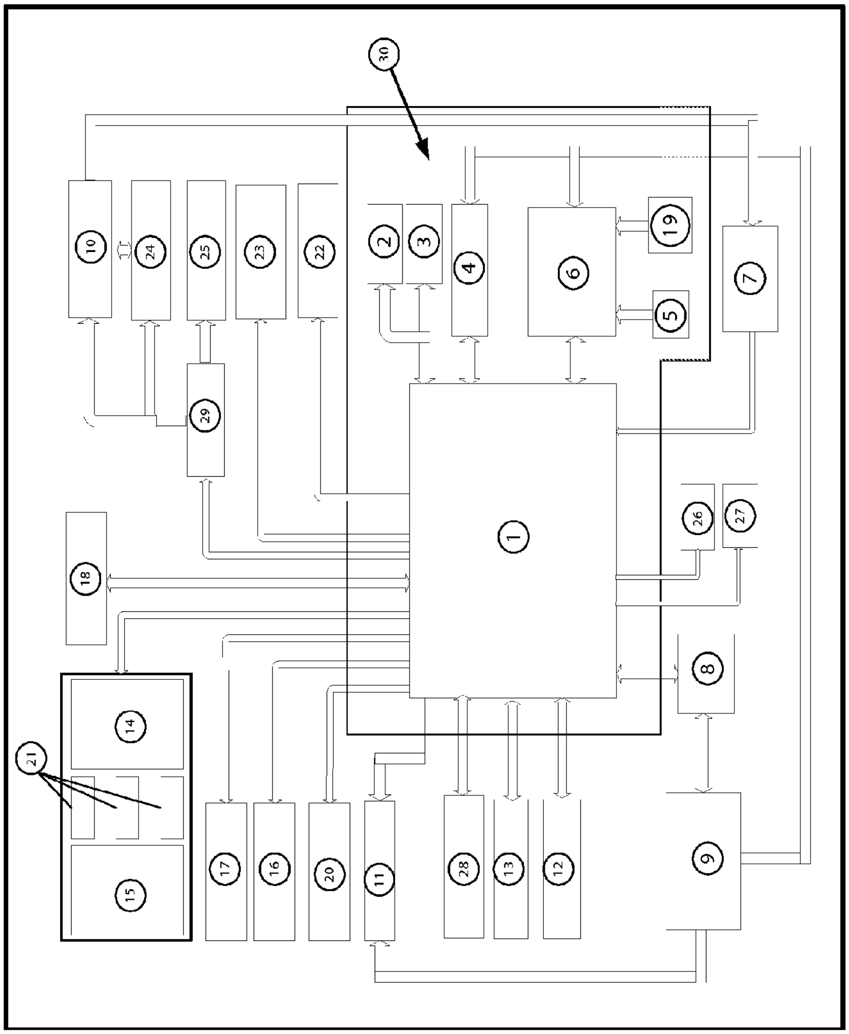

FIG. 1

FIG. 2

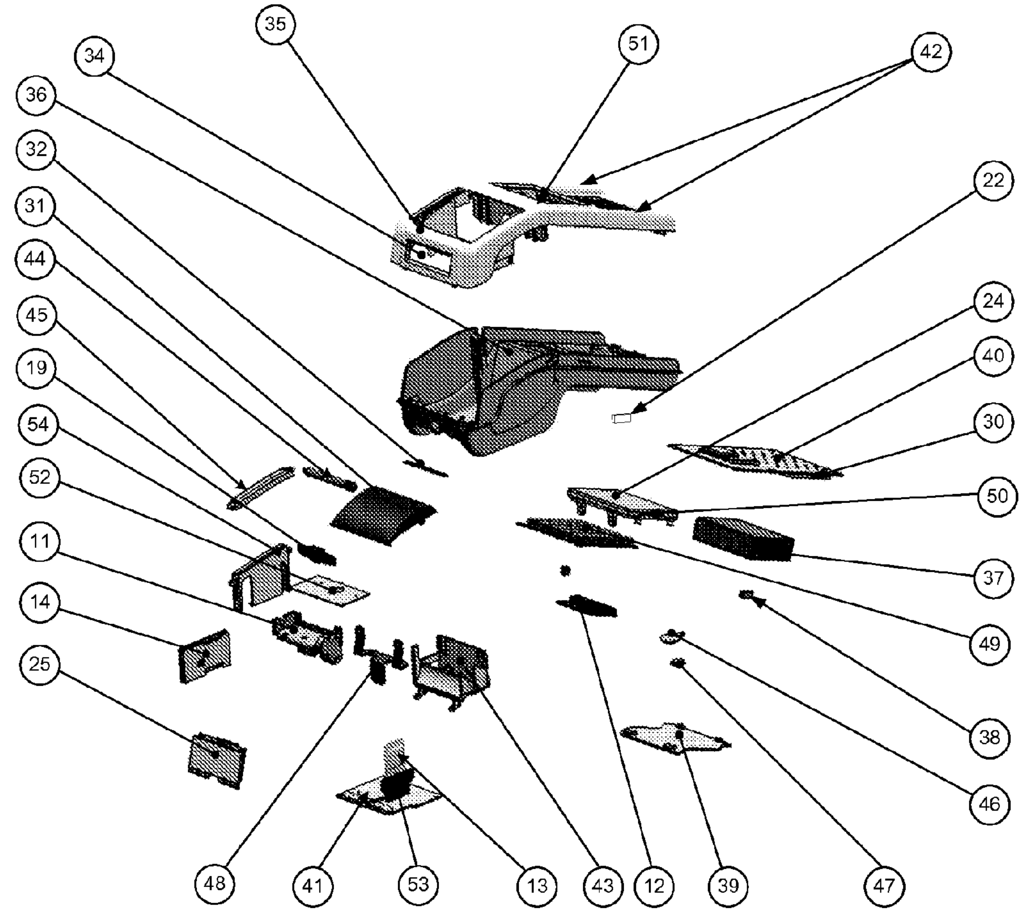

11 – 2" THERMAL PRINTER
12 – FISCAL MEMORY MODULE
13 – ELECTRONIC JOURNAL
14 – EMV L1 SMARTCARD READER
19 – SECURE MAGNETIC CARD READER
22 – BARCODE READER MODULE
24 – OPERATOR LCD (TFT-LCD MODULE)
25 – CUSTOMER DISPLAY
30 – EPOXY BOX
31 – PRINTER COVER
32 – PAPER CUTTER METAL
34 – CUSTOMER DISPLAY WINDOW
35 – UPPER COVER
36 – LOWER COVER
37 – LI-ION BATTERY
38 – BATTERY CONNECTOR
39 – BATTERY COVER
40 – MAINBOARD
41 – POWER BOARD
42 – PRIVACY SHIELD
43 – THERMAL PRINTER HOLDER
44 – THERMAL PRINTER ROLLER
45 – SCR ENTRY PROTECTOR
46 – SPEAKER COVER
47 – SPEAKER
48 – FISCAL SEAL HOLDER
49 – KEYPAD RUBBER
50 – TFT-LCD MODULE HOLDER
51 – MAGNETIC READER HEAD HOLDER
52 – PRINTER BOARD
53 – EJ READER BOARD
54 – SMARTCARD READER HOLDER

MULTI-COMMUNICATION FEATURED, TOUCH-OPERATED OR KEYBOARD CASH REGISTER WITH CONTACT AND NON-CONTACT CREDIT CARD READER

This application is being filed on 5 Aug. 2011, as a PCT International Patent application in the name of MT Bilgi Teknolojileri Dis Tic. A.S., a Turkish national corporation, applicant for the designation of all countries except the U.S., and, Asim Ferit Sagiroglu, a citizen of Turkey, and Aydin Celik, a citizen of Turkey, applicants for the designation of the U.S. only.

TECHNICAL FIELD

The invention relates to a multi-communication featured, touch-operated or keyboard financial electronic cash register with contact and non-contact credit card reader by which entire credit card actions may be financially recorded and any reporting may be made as desired.

The invention also relates to a multi-communication featured, touch-operated or keyboard financial electronic cash register with contact and non-contact credit card reader which may operate connected to the network or by built-in battery and which serves standard financial electronic cash register functions.

BACKGROUND

Today, registering the revenue flow of premises, which render services or sell goods, and inspection thereon by a governmental entity, for example, the Ministry of Finance for the Republic of Turkey, are majorly being performed via devices called financial cash register. Said financial electronic cash registers are employed in order to register daily sales and VAT revenues and to print vouchers which proves the sales amount to the client and to the Ministry of Finance. Within the same premises, it is not possible to completely match sales actions made via credit cards by using EFT POS devices and sales made via financial electronic cash registers.

The Ministry of Finance is informed about sales amounts by submitting info reports of issued vouchers to inspection units of the Ministry of Finance. In such a case tax inspection is dependant on financial electronic cash register user's disposal for issuing voucher and since sales made via credit cards by using EFT POS devices are not transmitted over financial electronic cash registers, significant tax losses arise. Sales over a certain amount already is not being registered via financial electronic cash registers and documented by sales invoices. For said invoice actions, only if an invoice is issued the sales is being registered financially. For collection over credit card payment methods, due to one or more EFT POS device procurement is necessary and due to difficulty in matching such collection data made via EFT POS devices with financial electronic cash registers, vouchers and tax inspections are being adversely affected.

Data sources of the Ministry of Finance-Tax Department established under the Ministry of Finance include tax offices. Tax offices register tax payable of each tax-payer based on statement thereof and calculated amount is transmitted to the Ministry of Finance-Tax Department over a data network. Data registered at the tax office is not simultaneously updated with tax-payer's/real person's sales, but based on the statement of tax-payer.

Generally, today, circulation of assets such as money, cheque etc. in financial markets cannot be duly registered. Since unregistered financial assets are not taxed, state economy is being damaged.

Moreover, since sales made are not simultaneously registered before the Ministry of Finance-Tax Department, time loss and labor loss for tax calculation and collection rises.

Technologic structures and memories of financial electronic cash registers used today must be developed. Moreover, in connection with the technologic development process in terms of appearance and design, the invention we have designed for introducing modern, practical, multi-function financial electronic cash registers shall bring numerous innovations and facilitate current system.

Consequently, necessity for a device in which a physically independent, separate plurality of units (EFT-POS device, Pinpad, Financial electronic cash register, optional Barcode Reader and yet optional GPS based positioning device) are integrated in one single compact frame and lack of current solutions entail a development in a related technical field. The Ministry of Finance's complaint on lack of control on revenues of professional groups, particularly, medical doctors, dentists, lawyers etc., underlies the basis for a solution for such areas. Likewise, since diverse areas such as district market-craftsmen, barrowmen who are taxed based on simple entry shall also be taxed according to real entry, the device seems to bring major advantages in terms of tax equity. Consideration on that solution for all these areas may be achieved by a multi-communication featured cash register with contact and non-contact credit card reader is one of the solid bases for launch of the project.

DESCRIPTION

The invention is generally a device where a plurality of independent units may be developed in a single unit consisting of a mainboard (40), a thermal-featured printer (11) connected to a power control and generation circuit (9) which compensates current during printing, two functional LCD graphic displays (24, 25) one for the operator at the front side and the other for a client at the back side, the front display covered with LCF which avoids visibility from sides by shadowing for ensuring data security during code access by client through touch screen type virtual keyboard, equipped with a touch screen type virtual keyboard or keyboard (10, 48) which handles any and all functions with respect to EFT POS device and financial electronic cash registers, magnetic type (19) and smart type (14) readers at sides, electronic records memory unit (13) where copies of entire print out actions realized under financial electronic cash register function are saved and financial memory unit (12) where financial data are saved, connection sockets on the back surface of the device for external peripheral units, backup storage (4) where banks' and other applications' security codes are saved, non-contact reader (15) which read data in the card and realize EFT POS payment approval without being contacted, sound circuit (23) which ensures 16 bit quality output, optional counterfeit money detector circuit (26), optional GPS module (16) which ensures positioning function, Barcode Reader Unit (22) which reads product codes printed in international standards, GSM/GPRS module (16) which ensures multi-communication feature of the device, PSTN unit (17) which ensures communication over standard telephone network, whereas the device is in readily wireless connectable manner to other devices through built-in Ethernet (18), RF (433 MHz, 868 MHz or 2.54 GHz) interfaces.

The invention relates to a multi-communication featured, touch-operated or keyboard financial electronic cash register with contact and non-contact credit card reader by which entire credit card actions may be financially recorded and any reporting may be made as desired. Besides such principal feature, the invention also supports optionally the features of international product code (Barcode) reading and global positioning (GPS).

The invention relates to a multi-communication featured, touch-operated or keyboard financial electronic cash register with contact and non-contact credit card reader which may operate connected to the network or by built-in battery and which serves standard financial electronic cash register functions. The invention ensures 10 hours of operation by 4 hours of charge.

The invention relates to a device which features sales, cancel, error correction, cancel, voucher cancel, remote invoicing, wire or wireless connection under network, key intermingling on touch screen type virtual keyboard utility during pin access and avoiding visibility from sides by LCF cover, touch virtual keypad on color TFT display, whereas the device enables printing X report with discount, increase functions, X term report, X PLU program and X PLU sales reports, Z report, Z term report, abstract and detail financial memory reports and EKÜ details report, EKÜ voucher details report, EKÜ Z details report, EKÜ voucher reports, and also where EFT POS functions are realized such as Credit/Debit card authorization, any smart card application, end-of-day actions, remote maintenance actions, remote code uploading actions (application software and operating system) and statistical data updating, as well as featuring optionally counterfeit money detection, reading international product codes (Barcode) and global positioning (GPS).

EXAMPLE PURPOSES OF THE INVENTION

EFT POS devices currently employed can only support 8 different bank application software packages at most. A multi-communication featured, touch-operated or keyboard cash register with contact and non-contact credit card reader according to the present disclosure will integrate 16 bank application software packages in one single device.

The multi-communication featured, touch-operated or keyboard cash registers with contact and non-contact credit card readers shall gather financial electronic cash registers and EFT POS software and bank application software not severally but in one single memory (Flash Memory) without scrambling these software packages.

As mentioned above, today, registering revenue flows of premises and inspection thereon are mainly performed via financial electronic cash registers. Financial electronic cash registers are solely employed to register daily sales and VAT revenues and to print out vouchers which notify Client/Ministry of Finance the sales details. In case collection via payment methods such as credit card is desired, one or more EFT POS device becomes necessary, and on Ministry of Finance side, matching financial electronic cash register vouchers and EFT POS collections is troublesome and often impossible. Necessity for an innovative device composed of a single unit under a compact frame, and inadequacy of solutions in effect oblige development in relevant technical field.

The invention is going to perform independent actions by functionally serving as a financial electronic cash register and EFT-POS device, but also be integrated in a single product in terms of hardware and software architecture. Independent data input-output actions performed over separate devices shall be reduced by function-sharing over a single device, thus, action-repetitions shall be eliminated and facility and time saving shall be ensured. By integrating numerous devices such as a financial electronic cash register, an EFT POS device, an optional Barcode Reader and optional GPS based positioning device, diverse hardware shall be reduced into one single unit (instead of 2 or more printers and power supplies, one printer and power supply, instead of 3 or more displays, 2 displays) which in turn will bring cost advantage. During our surveys, no such integrated product was available. Our device shall be unrivalled in the market.

Electronic circuit design, analysis and PCB drawing shall be realized via Altium Designer Summer Edition software, whereas power supply program of the system shall be realized via KEIL ARM C compiler. For the boot program to be loaded by CPU onto an operating system, AVR32 GCC C compiler and AVR32 GCC Assembler language shall be utilized, whereas the operating system shall be compiled by AVR32 GCC C compiler. File system shall be compiled via Linux Buildroot tools.

Basically QT software development libraries will be employed. In order to develop device drivers and application layer software, a special C/C++ complier shall be created in the basis of Linux GCC, named MTCC. For low-level device drivers, MTCC software development package shall be utilized. Low-level application development interface shall be scripted via MTCC, whereas Valgrind shall serve for debugging. Main application of the device, router software, shall be designed via low-level application development interface and for high-level applications message-event based structure shall be utilized. In order to establish message-event mechanism in operating system level, a messaging driver being directly connected to core code shall be designed. Financial electronic cash register application shall be designed as a high-level application which employs router application. In order to complete device approvals, a basic, EMV based EFT POS bank application shall be developed, where such applications shall both operate in compliance with financial electronic cash register application and fulfill any actions required by a standard EMV application.

By integrating a plurality of independent devices, common hardware shall be reduced, namely, instead of two separate printers a single printer, instead of three separate displays two displays and instead of two separate power supplies a single power supply shall be used, thus, cost and energy saving shall be ensured. Premises shall become free of the obligation to retain severally a financial electronic cash register and at least an EFT POS device, and any actions shall be possible via an integrated single device. The Ministry of Finance shall be able to control any and all tax-payers such as medical doctors, lawyers, district market craftsmen and mobile service providers, in terms of both credit card and cash actions.

The invention has a plurality of goals, which include;

Integrating at the same point numerous independent units in a compact, single unit frame, Reducing physical multitude over counters (place of utility), Reducing several data input-output made over independent devices by function-sharing, and eliminating action repetitions, thus, ensuring action facility and time saving, Integrating numerous devices in one single unit by common hardware (single printer instead of two independent printers, two displays instead of three independent displays, single power supply instead of two independent power supplies etc.), thus, cost saving, Energy saving by employing a single power supply in a single unit instead of independent power supplies in numerous devices, By integrating a single and compact product and utilizing state-of-the-art innovations, making the device suitable for manual and mobile applications, With respect to such device which shall generally be placed on retail sales counters, by connecting the device via built-in Ethernet circuit, PSTN or GSM/GPRS modem to communication networks, realizing credit payments and electronic fund transfer actions made via magnetic or smart credit cards, hence, performing any and all actions of a financial electronic cash register, By mobile utility features, without necessitating wire connection, taking the advantage of portability of the device, Functionally, carrying out independent actions both as a financial electronic cash register and EFT POS device, Optionally, featuring Barcode Reader and GPS based positioning device, Composing an integrated, single product by hardware and software architecture thereof, As being a multi-communication featured, touch-operated or keyboard financial electronic cash register with contact and non-contact credit card reader, performing any and all cash register actions as well as payment actions via credit cards and smart cards (EFT POS actions).

With this product, it is possible to financially register any credit card actions and to report as desired. Nevertheless, obligation to have a EFT POS device and a financial electronic cash register for medical doctors and lawyers is coming to a solution with a single device. EFT POS devices installed by banks at premises and financial electronic cash register, which must be utilized by the same premises as a tax-payer, is being integrated, thus, such an integrated device brings numerous advantages over current application.

Furthermore, the device bears an electronic recording unit, thus, second voucher copy shall be saved in the unit without being printed, which in turn avoids paper waste and brings an environment-friendly approach. The device shall operate by being connected to the network or by a built-in battery, and shall perform standard financial electronic cash register functions. The device shall support functions of a financial electronic cash register such as sales, cancel, error correction, cancel, voucher cancel, discount, increase functions as well as printing of X reports, X term reports, X PLU sales reports, X PLU software reports, Z reports, Z term reports, abstract and detail financial memory reports, EKÜ detail reports, EKÜ voucher detail reports, EKÜ Z detail reports and EKÜ-voucher copies, and the device shall also perform Credit/Debit card authorization, any sort of smart card applications, end-of-day actions, remote maintenance actions, remote code uploading actions (application software and operating system) and EFT POS actions such as statistical data updating.

DETAILED DESCRIPTION OF THE INVENTION

The invention is comprised of a CPU of 32 bit Risc-media based, having 210 MIPS, MMU, and digital signal processing (DSP) Unit.

Application of multi-communication featured, touch-operated or keyboard cash register with contact and non-contact credit card shall be designed as a high-level application utilizing router application.

Multi-communication featured, touch-operated or keyboard cash register with contact and non-contact credit card reader shall be manual-type and include functional units such as a magnetic card reader (19) in mobile device, a smart card reader (14), a thermal printer (11), a pinpad, SIM cards, financial memory unit (12), a CPU integrated with e-recording unit (13).

For touch-display type virtual keypad (10) utility, the keys necessary for any and all EFT-POS device and financial cash register actions shall be displayed on the display. For touch-display type virtual keypad utility, the unit shall be covered by LCF and visibility from sides of the pin accessed shall be avoided. At any case, two independent functional LCD displays (24, 25) shall be present, one at the front for the operator and the other at back for the client.

The device shall include a thermal-featured (11) printer with easy paper-feeding function. The device shall be of compact type and client shall hold the device manually to input credit card code (PIN code). The device shall be equipped with improved magnetic type and contact/non-contact smart type credit card readers and such readers shall be placed as to make shadowing during pin access in order to ensure data security.

In order to replace the paper roll in the paper roll housing to be employed by device printer, a collapsible cover shall be present. An electronic record memory unit (E-recording unit), where any and all printer output actions carried out under financial electronic cash register functions are saved, and a financial memory unit, where financial data (total sales amount, total VAT amount etc.) are saved, shall be present. For operating power, a built-in battery shall be available in the collapsible cover at the back side.

The back surface shall host connection sockets to external peripheral units (computer, external 2d-barcode reader etc.). The device shall be equipped with mechanical, electromechanical and electronic security locks against unauthorized interventions, thus, in case of an intervention to open the device, entire functions shall be locked and data saved shall be secured; hence, data loss and abuse utility shall be avoided. Moreover, the financial memory, where financial data are saved, and the memories, where EFT-POS security functions are saved, shall be embedded severally into epoxy box (30), thus, physical access shall be avoided.

For touch-display type virtual keypad utility, the unit shall be designed to be able to be used for EFT-POS device, Pinpad and financial electronic cash register functions. Virtual keypad shall be designed in compliance with PCI compatibility standards which will ensure security during client Pin access. Such compatibility is prerequisite for EFT-POS devices.

Of the two independent functional graphic displays located at front and back parts, the display (24) at the front is for the user and the display (25) at back is for the client. Pursuant to technical specifications for financial electronic cash registers, each figure and character on the display during an action shall not be less than 7 mm.

The printer (11) in the device is of thermal feature, and shall be able to print on 2" width paper. Magnetic readers, which are credit card readers and Smart credit card readers, shall be placed next to the front display. Smart card reader client Pin code data shall be EMVCo Type-approved due to security reasons (international obligation).

Non-contact Card (Paypass) Reader (15) is the unit which approves EFT-POS payment by reading the data in the card without being touched. While developing low level- and high level libraries for non-contact reader, Gemalto's Paypass Kit shall be taken as reference, and SmartSpy Contactless software functions shall be employed.

The device shall be readily connectable to other devices or to a wire or wireless network via built-in Ethernet, RS232 serial communication, (18), RF (433 MHz, 868 MHz or 2.54 GHz) interfaces.

Power Supply Unit (9) shall carry on any and all functions for a certain period via operating power-battery in case of main power failure. The battery shall be placed in a readily accessible and replaceable position within the collapsible cover at the lower part.

Power control unit software of the system shall be realized via KEIL ARM C compiler. Power control unit shall also undertake charge control functions.

Within the financial memory unit (12) in the device, an unalterable-featured, no external power-requiring memory shall be present, in which daily total sales amount and VAT amount is saved, and which is in compliance with cash register technical specifications.

E-Recording Unit (13) has an electronic memory module in which entire actions made via the cash register are saved. The memory shall be readily removable and/or replaceable (by a vacant one) by the user once such memory is full. The memory shall have a warning signal which operates once memory is nearly full.

Multi-communication featured, touch-operated or keyboard cash register with contact and non-contact credit card reader shall be equipped with mechanical and electronic security locks (6) against external interventions and abuse usage. Such locks and measures are as required by technical specifications for both EFT POS device and financial electronic cash register.

Main board (40) (in which AVR32 RISC processor and epoxy space are present): The card shall be designed in 10-layer form for security purposes and in accordance with EMC conditions. The card shall host AVR32 RISC processor, secure static memory (SRAM), transient memory (SDRAM), and program storage (FLASH ROM). All such units shall be located in the epoxy space. Apart from these, secure keyboard circuit, 16-bit sound and Ethernet circuits shall also be placed on this card.

As a condition for EFT POS devices, in the event of an intervention against firewall of the device, an electromechanical key shall activate and automatically lock and avoid the functions of the device. Once the electromechanical key is re-inserted and code access is made by an authorized person, the device shall operate again.

Pursuant to financial electronic cash register conditions, financial memory shall be placed in the body in an epoxy-covered form. Furthermore, a mechanical locking and sealing thereon shall be possible which voids intervention against internal electronic hardware of the device, and prohibits opening of covers which protect internal hardware of the device.

The device, in case of any failure or misuse, shall operate a message- or audio warning on the display.

Since the invention hosts a hardware Image Processing Unit, the device operates multimedia applications including MPEG4/H.264, which require high processing power, under high performance and without necessitating an additional hardware.

The invention, thanks to hardware DSP (digital signal processing) unit, enables high rate operation in hardware level for encoding algorithms such as DES, TripleDES, AES and RSA.

Hardware DSP unit enables digital audio files, such as MP3, to be played without affecting running speed thereof.

The invention, thanks to Improved LCD Display Unit, enables usage of ITT panels up to very high resolutions (2048×2048).

By means of built-in Improved LCD Display Unit, the image on the built-in display of the device is transferred to an external display (plasma TV, LCD TV etc.) via an optional VGA connection.

An optional built-in GPS receiver module enables easy realization of positioning and point follow up on any type of map.

A built-in non-contact reader on the device supports both Paypass applications and NFC, Mifare, Sony Felica and further ISO14443A&B applications.

A wireless interface communication employs hardware signal processing blocks in the device, thus, enables solid encoding methods by not affecting communication speed.

By virtue of the 16-bit stereo audio system directly supported by the invention, the sound quality is even higher than of CDs. While CD sound quality is recognized as 44.1 kHz, the device may go up to 50 kHz.

The invention supports Ethernet and dial-up PSTN network as well as standard GSM/GPRS connection, thus, ensures connection with the center in any environment.

The invention, compared to current solutions (2400 bps), provides much faster application- and operating system-updating thanks to high rate 56 Kbps PSTN dial-up modem.

Please find below in Table 1 the technical features of the invention.

TECHNICAL SPECIFICATIONS FOR MULTI-COMMUNICATION FEATURED, TOUCH-OPERATED OR KEYBOARD CASH REGISTER WITH CONTACT AND NON-CONTACT CREDIT CARD READER

| | |
|---|---|
| CPU: | 32 bit AVR32 RISC based, Microprocessor including 210MIPS, MMU, DSP Unit, Hardware Image Processing Unit |
| Program Storage: | 16 Mbyte standard (max. 2 Gbyte) |
| Transient Memory: | 16 Mbyte standard (max. 256 Mbyte) |
| Secure Memory: | 32 Kbyte standard (max. 64 Mbyte) |
| Operator Display: | 320 × 240 color TFT-LCD standard |
| Client Display: | 122 × 32 Mono Graphic LCD |
| Smart Card Reader: | EMV 2000 v4.2 Level 1 approved contact smart card reader |
| Non-contact Reader: | EMV Contactless Level 1 approved non-contact reader |
| Felica | ISO4443A & ISO14443B, MIFARE, NFC, Sony |
| Magnetic Card Reader: | ISO7811/2 compatible 2 or 3-track reader |
| Printer: | 2" rapid thermal printer |
| Ethernet: | Built-in 10/100 Mbit interface |
| Serial Interface: | 2 units of ESD protected RS232 interface standard(max. 115200 bps) |
| RS-485: | 1 unit of RS-485 interface (synchronous HDLC or asynchronous) Optional |
| Dial-up Connection: | Standard 56K PSTN modem |
| Wireless Interface: | RF module (standard) which ensures wireless communication in an encoded and secure manner over 433 MHz, 868 MHz, 915 MHz and 2.45 GHz bands |
| GSM Modem: | Standard GSM/GPRS modem |
| GPS Module: | Optional GPS module |
| Barcode Reader: | Optional Mini built-in barcode reader; enables rapid sales action |
| Sound: | Standard 16-bit stereo max. 50 kHz sound card |
| Keypad: | PCI-PED compatible secure touch-operated or keyboard. For touch-operated option, visual touch keys on 480 × 272 TFT-LCD |
| Financial Memory: | Microprocessor secure financial memory module |
| Electronic Recording: | High-capacity module featuring encoded communication and private data script |
| Financial Memory: | DES, TripleDES, RSA, AES encoding algorithms Master/Session and DUKPT key management, maintaining security among display, keyboard and security modes by numerous methods |
| Operating System: | Real-time, multi-application, message-event based operating system with Linux 2.6 core |
| Multi-application: | Firewall controlled multi-application support. Each application operates at assigned flash and RAM memory parts. Failing applications, for whatsoever reason, do not affect remaining applications and the operating system. |

-continued

| TECHNICAL SPECIFICATIONS FOR MULTI-COMMUNICATION FEATURED, TOUCH-OPERATED OR KEYBOARD CASH REGISTER WITH CONTACT AND NON-CONTACT CREDIT CARD READER | |
|---|---|
| Software Update: | Operating system-, driver-, library-, API- and application update from phone line, Ethernet card and EFT POS to EFT POS (full or partial) |

DESCRIPTION OF DRAWINGS

FIG. 1 block diagram scheme of the invention

FIG. 2 profile of detailed components of the invention

Reference numbers

| REF NO | COMPONENT |
|---|---|
| 1 | 32 bit RISC Media Processor |
| 2 | Flash Memory |
| 3 | SDRAM Memory |
| 4 | Secure Memory |
| 5 | Keypad |
| 6 | SECURITY Control Processor |
| 7 | Secure touch-operated control processor |
| 8 | 32 bit Power Control Processor (Power CPU) |
| 9 | Power Control and Generation Circuit |
| 10 | Touch- virtual keyboard |
| 11 | Thermal Printer |
| 12 | Fiscal Memory |
| 13 | E- Journal |
| 14 | EMV L1 Smart Card Reader |
| 15 | Paypass Contactless Card Reader |
| 16 | GSM/GPRS Module |
| 17 | 56K PSTN Modem |
| 18 | 10/100 Mbit Ethernet |
| 19 | Secure Magnetic Card Reader |
| 20 | GPS Module |
| 21 | SAM 1-2-3 |
| 22 | Built-in Barcode Reader |
| 23 | 16-bit Sound Card |
| 24 | Operator LCD |
| 25 | Customer LCD |
| 26 | Fake Money Detector |
| 27 | Drawer |
| 28 | RS232 Port |
| 29 | LCD control Block |
| 30 | Epoxy-coated secure area |
| 31 | Printer Cover |
| 32 | Paper Cutter Metal |
| 33 | Barcode Reader Window |
| 34 | Client LCD Window |
| 35 | Upper Cover |
| 36 | Lower Cover |
| 37 | Li-Ion Battery |
| 38 | Battery Connector |
| 39 | Battery Cover |
| 40 | Mainboard |
| 41 | Power Board |
| 42 | Privacy Shield |
| 43 | Thermal Printer Holder |
| 44 | Thermal Printer Roller |
| 45 | Paper Cutter Metal |
| 46 | Smartcard Entry Protector |
| 47 | Speaker Cover |
| 48 | Speaker |
| 49 | Fiscal Seal Holder |
| 50 | Keypad Rubber |
| 51 | TFT LCD Module Holder |

The invention claimed is:

1. A device useable in commercial premises, including a plurality of independent units in single unit, the device design including a mainboard (40), a thermal-featured printer (11) connected to a power control and generation circuit (9) of the mainboard which compensates current during printing, two functional LCD graphic displays (24, 25) including a first functional LCD graphic display for an operator at front side and a second functional LCD graphic display for a client at back side, the first functional LCD graphic display covered with LCF to avoid visibility from sides by shadowing for ensuring data security during code access by client through touch screen type virtual keyboard, the device further equipped with a touch screen type virtual keyboard or keyboard (10) which handles point-of-sale (POS) and financial electronic cash register functions, the device further comprising magnetic type (19) and smart type (14) readers at sides, an electronic records memory unit (13) where copies of entire print out actions realized under financial electronic cash register function are saved and financial memory unit (12) where financial data are saved, a connection sockets on the back surface of the device for external peripheral units, a backup storage (4) where bank and application security codes are saved, a non-contact reader (15) which reads data in the card and realizes point of sale payment approval without being contacted, a sound circuit (23) which ensures 16 bit quality output, a Barcode Reader Unit (22) which reads product codes printed in international standards, a built-in optional barcode reader (22) which hosts a resolution of 2500 pixels, a reading angle of 42°, scanner feature of 200 scans/sec, recognition from 30% and above print darkness, and ability to decode any or all barcode encoding types, a GSM/GPRS module (16) which ensures multi-communication feature of the device, and a PSTN unit (17) which ensures communication over standard telephone network, wherein the device is in readily wireless connectable manner to other devices through built-in Ethernet (18), RF (433 MHz, 868 MHz or 2.54 GHz) interfaces.

2. A device useable in commercial premises, including a plurality of independent units in single unit, the device design including a mainboard (40), a thermal-featured printer (11) connected to a power control and generation circuit (9) of the mainboard which compensates current during printing, two functional LCD graphic displays (24, 25), including a first functional LCD graphic display for an operator at front side and a second functional LCD graphic display for a client at back side, the first functional LCD graphic display covered with LCF to avoid visibility from sides by shadowing for ensuring data security during code access by client through touch screen type virtual keyboard, the device further equipped with a touch screen type virtual keyboard or keyboard (10) which handles point-of-sale (POS) and financial electronic cash register functions, the device further comprising magnetic type (19) and smart type (14) readers at sides, an electronic records memory unit (13) where copies of entire print out actions realized under financial electronic cash register function are saved and financial memory unit (12) where financial data are saved, and it includes a epoxy coated secure space (30) which is installed into the device and avoids access, a connection sockets on the back surface of the device for external peripheral units, a backup storage (4) where bank and application security codes and sensitive data are saved, a non-contact reader (15) which reads data in the card and realizes point of sale payment approval without being contacted, a sound circuit (23) which ensures 16 bit quality output, a Barcode Reader Unit (22) which reads product codes printed in international standards, a GSM/GPRS module (16) which ensures multi-communication feature of the device, and a PSTN unit (17) which ensures communication over standard telephone network, wherein the device is in readily wireless connectable manner to other devices through built-in Ethernet (18), RF (433 MHz, 868 MHz or 2.54 GHz) interfaces.

3. A device useable in commercial premises, including a plurality of independent units in single unit, the device design including a mainboard (40), a thermal-featured printer (11) connected to a power control and generation circuit (9) of the mainboard which compensates current during printing, two functional LCD graphic displays (24, 25), including a first functional LCD graphic display for an operator at front side and a second functional LCD graphic display for a client at back side, the first functional LCD graphic display covered with LCF to avoid visibility from sides by shadowing for ensuring data security during code access by client through touch screen type virtual keyboard, the device further equipped with a touch screen type virtual keyboard or keyboard (10) which handles point-of-sale (POS) and financial electronic cash register functions, the device further comprising magnetic type (19) and smart type (14) readers at sides, an electronic records memory unit (13) where copies of entire print out actions realized under financial electronic cash register function are saved and financial memory unit (12) where financial data are saved, connection sockets on the back surface of the device for external peripheral units, a backup storage (4) where bank and application security codes are saved, a non-contact reader (15) which reads data in the card and realizes point of sale payment approval without being contacted, a sound circuit (23) which ensures 16 bit quality output, a Barcode Reader Unit (22) which reads product codes printed in international standards, a GSM/GPRS module (16) which ensures multi-communication feature of the device, and a PSTN unit (17) which ensures communication over standard telephone network, wherein the device is in readily wireless connectable manner to other devices through built-in Ethernet (18), RF (433 MHz, 868 MHz or 2.54 GHz) interfaces, a GPS module (20) which has location-finding and positioning features.

* * * * *